(12) United States Patent
Huang et al.

(10) Patent No.: US 10,911,259 B1
(45) Date of Patent: Feb. 2, 2021

(54) SERVER WITH MASTER-SLAVE ARCHITECTURE AND METHOD FOR READING AND WRITING INFORMATION THEREOF

(71) Applicants: INVENTEC (PUDONG) TECHNOLOGY CORPORATION, Shanghai (CN); INVENTEC CORPORATION, Taipei (TW)

(72) Inventors: Wei Huang, Shanghai (CN); Kun Liu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/794,089

(22) Filed: Feb. 18, 2020

(30) Foreign Application Priority Data

Oct. 31, 2019 (CN) .......................... 2019 1 1048597

(51) Int. Cl.
| | |
|---|---|
| *G06F 13/00* | (2006.01) |
| *H04L 12/403* | (2006.01) |
| *G06F 11/30* | (2006.01) |
| *G06F 9/4401* | (2018.01) |
| *G06F 13/42* | (2006.01) |

(52) U.S. Cl.
CPC .......... *H04L 12/403* (2013.01); *G06F 9/4401* (2013.01); *G06F 11/3072* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 5,819,053 A | * | 10/1998 | Goodrum | G06F 11/349 710/100 |
| 2009/0234999 A1 | * | 9/2009 | Huang | G06F 13/4291 710/110 |
| 2017/0251059 A1 | * | 8/2017 | Sawada | H04L 67/125 |

* cited by examiner

*Primary Examiner* — Henry Tsai
*Assistant Examiner* — Dean Phan
(74) *Attorney, Agent, or Firm* — Maschoff Brennan

(57) ABSTRACT

A server with a master-slave architecture and a method of reading and writing information thereof provided by the present disclosure include a master node, a multi-path selector and at least two slave nodes. Each slave node is connected to the master node through the multi-selector. The slave node includes a slave-node BIOS and a slave-node memory. The slave-node BIOS is configured to record slave-node information in the slave-node memory. The master node includes a master-node BIOS, a master-node memory and a baseboard management controller. The master-node BIOS is configured to record master-node information in the master-node memory. The baseboard management controller is configured to access the master-node memory and decide to access the slave-node memory of one of the slave nodes through the multi-path selector.

8 Claims, 2 Drawing Sheets

SERVER WITH MASTER-SLAVE ARCHITECTURE AND METHOD FOR READING AND WRITING INFORMATION THEREOF

CROSS-REFERENCE TO RELATED APPLICATIONS

This non-provisional application claims priority under 35 U.S.C. § 119(a) on Patent Application No(s). 201911048597.6 filed in China on Oct. 31, 2019, the entire contents of which are hereby incorporated by reference.

BACKGROUND

1. Technical Field

This disclosure relates to a server, more particularly to a server with a master-slave architecture and a method for reading and writing information thereof.

2. Related Art

In the prior art, all x86 platform server models are equipped with a basic input output system (BIOS) and a baseboard management controller (BMC) in a motherboard. Since the BIOS would pass the control to the operation system (OS) after the boot is completed, the system will be triggered to enter a system management mode (SMM) when an error occurs in the system such as error checking and correcting (ECC). At this time, the BIOS would obtain the control again for a short time, locate the component and the position where the error occurs by checking relevant registers in the system, and further send relevant information to the BMC for storing through intelligent platform management interface (IPMI) command, so that a user can check the corresponding error records according to the IPMI command. Furthermore, in the process of booting the system, the BIOS will notify the BMC of the completion of Power On Self Test (POST) for recording an event of normal booting and indicating the number and the time which the use records and manages the event of booting.

However, several defects exist in the above method:

(1) if errors occur in the system and the BMC at the same time, then the BIOS cannot record corresponding error information for the BMC via the IPMI command after entering the SMM;

(2) An online working server is actually implemented based on a cooperation of several servers in a whole chassis or in a rack. For some single systems with relatively poor performance, one BMC is used on a mainboard, which results in a challenge of costs.

SUMMARY

In view of the above disadvantages of the prior art, the purpose of the present disclosure is to provide a server with a master-slave architecture and a method for reading and writing information thereof. In the server with the master-slave architecture, memories are used for recording the triggering event information and the system error information. Thereby, hardware costs are reduced effectively. Moreover, it is not affected by hardware states and has a high stability practicality.

In order to achieve the above purpose and other related purposes, a server with a master-slave architecture is disclosed in the present disclosure. The server includes a master-node, a multi-path selector and at least two slave-nodes; each of the at least two slave-nodes is connected to the master-node through the multi-path selector; the slave-node includes a slave-node basic input/output system and a slave-node memory; the slave-node basic input/output system is configured to record slave-node information in the slave-node memory; the master-node includes a master-node basic input/output system, a master-node memory and a baseboard management controller; the master-node basic input/output system is configured to record master-node information in the master-node memory, the baseboard management controller is configured to access the master-node memory and decide to access the slave-node memory of one of the at least two slave-nodes.

In one embodiment of the present disclosure, the slave-node information includes one or more combinations of triggering event information and system error information; the master-node information includes one or more combinations of triggering event information and system error information.

In one embodiment of the present disclosure, the slave-node basic input/output system accesses the slave-node memory through a slave-node south bridge chip; the slave-node south bridge chip is connected to the slave-node memory via a system management bus interface.

The master-node basic input/output system accesses the master-node memory through a master-node south bridge chip; the master-node south bridge chip is connected to the master-node memory via a system management bus interface.

In one embodiment of the present disclosure, a general purpose input/output port of the master-node south bridge chip is connected to a general purpose input/output port of the baseboard management controller; when a general purpose input/output port signal is a first value, the master-node basic input/output system accesses the master-node memory; when the general purpose input/output port signal is a second value, the baseboard management controller accesses the master-node memory.

In one embodiment of the present disclosure, the baseboard management controller is connected to the multi-path selector via a $I^2C$ bus, and the multi-path selector is connected to the slave-node memory via a $I^2C$ bus.

A method for reading and writing information in a server with a master-slave architecture is disclosed in the present disclosure. The server with the master-slave architecture includes a master-node, a multi-path selector and at least two slave-nodes; each of the at least two slave-nodes is connected to the master-node through the multi-path selector; the slave-node includes a slave-node basic input/output system and a slave-node memory, and the master-node includes a master-node basic input/output system, a master-node memory and a baseboard management controller;

The method for reading and writing information in the server with the master-slave architecture includes:

by the slave-node basic input/output system, recording information of the slave-node in the slave-node memory;

by the master-node basic input/output system, recording information of the master-node in the master-node memory;

by the baseboard management controller, accessing the master-node memory and deciding to access the slave-node memory of one of the at least two slave-node through the multi-path selector.

In one embodiment of the present disclosure, the information of the slave-node includes one or more combinations of triggering event information and system error information; the information of the master-node includes one or more combinations of triggering event information and system error information.

In one embodiment of the present disclosure, the slave-node basic input/output system accesses the slave-node memory through a slave-node south bridge chip; the slave-node south bridge chip is connected to the slave-node memory via a system management bus interface;

The master-node basic input/output system accesses the master-node memory through a master-node south bridge chip; the master-node south bridge chip is connected to the master-node memory via a system management bus interface.

In one embodiment of the present disclosure, a general purpose input/output port of the master-node south bridge chip is connected to a general purpose input/output port of the baseboard management controller; when the general purpose input/output port signal is a first value, the master-node basic input/output system accesses the master-node memory; when the general purpose input/output port signal is a second value, the baseboard management controller accesses the master-node memory.

In one embodiment of the present disclosure, the baseboard management controller is connected to the multi-path selector via a I²C bus, and the multi-path selector is connected to the slave-node memory via a I²C bus.

As described above, the server with the master-slave architecture and the method for reading and writing information thereof of the present disclosure have the following beneficial effects:

(1) In the server with the master-slave architecture, memories are used for recording the triggering event information and the system error information. There is no need to set a BMC for each node of the server, thereby hardware costs are reduced effectively;

(2) Even though an error occurs in the BMC of the master-node, normal records of information can be still ensured and thereby it is not affected by hardware states and has a high stability.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

The embodiments of the present disclosure are illustrated by specific embodiments below, and persons skilled in the art are able to easily understand other advantages and effects of the present disclosure from the disclosure of the specification.

It is to be realized that the structures, the proportions, the sizes and the like, which are illustrated in drawings of the specification, are merely used in conjunction with the disclosure of the specification for understanding and reading by those skilled in the art, but are not intended to limit the present disclosure, therefore, not technically meaningful. Any modification of structure, change of proportional relationship or adjustment of size which are made without affecting the effects and the purposes of the present disclosure, should be within the scope of the present disclosure. Meanwhile, the terms "upper", "lower", "left", "right", "middle" and "one" as mentioned in the specification are merely used for convenience of description, but not intended to limit the scope of embodiments of the present disclosure. The change or adjustment of the relative relationship, which is made without changing the technical contents, should be considered as being within the scope of the present disclosure.

In the server with the master-slave architecture and the method for reading and writing information thereof disclosed in the present disclosure, memories are used for recording the triggering event information and the system error information. There is no need to set a BMC for each node of the server, thereby hardware costs are reduced effectively. Moreover, it is not affected by hardware states and has a high stability practicality.

Figure 1:
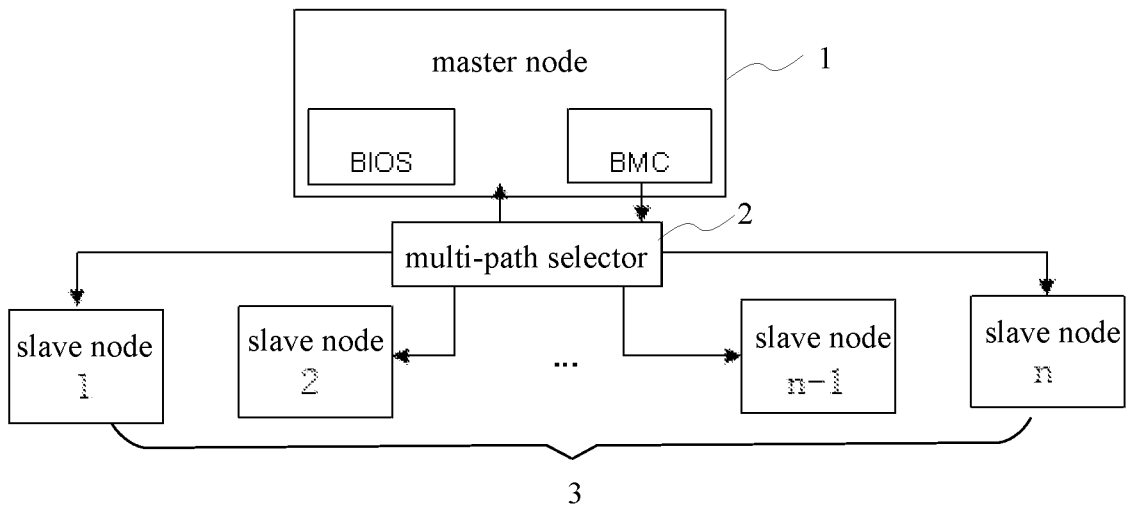
FIG. 1 is a structural diagram of a server with a master-slave architecture according to one embodiment of the present disclosure.

As shown in FIG. 1, in one embodiment, a server with a master-slave architecture of the present disclosure includes a master node 1, a multi-path selector 2 and at least two slave-node 3 (a slave-node 1, a slave-node 2 . . . a slave-node n−1 and a slave-node n). wherein, the master-node 1 is connected to each of the slave-nodes 3 via the multi-path selector 2.

Figure 3:
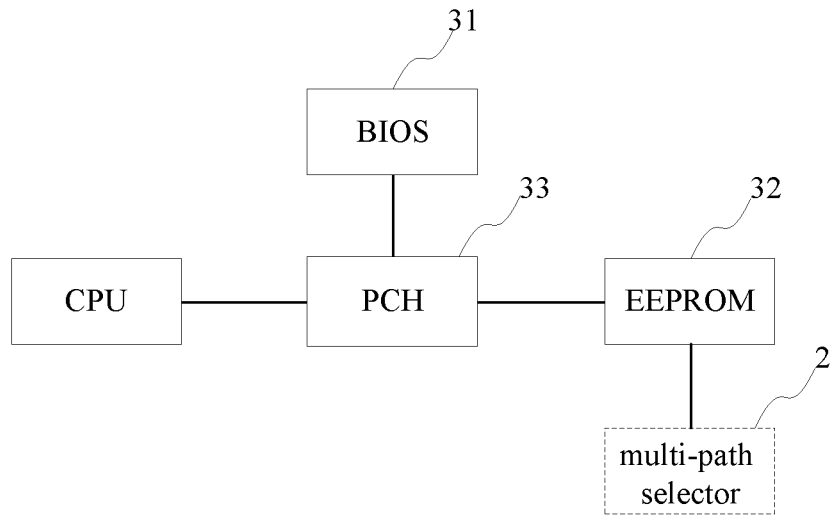
FIG. 3 is a structural diagram of a slave-node according to one embodiment of the present disclosure.

As shown in FIG. 3, the slave-node 3 at least includes a slave-node basic input/output system (BIOS) 31 and a slave-node memory 32 (e.g. EEPROM). Wherein, the slave-node BIOS 31 is configured to record slave-node information into the slave-node memory 32. In one embodiment of the present disclosure, the slave-node BIOS accesses the slave-node memory 32 through a slave-node south bridge chip 33 (PCH). The slave-node south bridge chip 33 is connected to the slave-node memory 32 via a system management bus (SMBus) interface.

In one embodiment of the present disclosure, the slave-node information includes one or more combinations of the slave-node triggering event information and the slave-node system error information.

Figure 2:
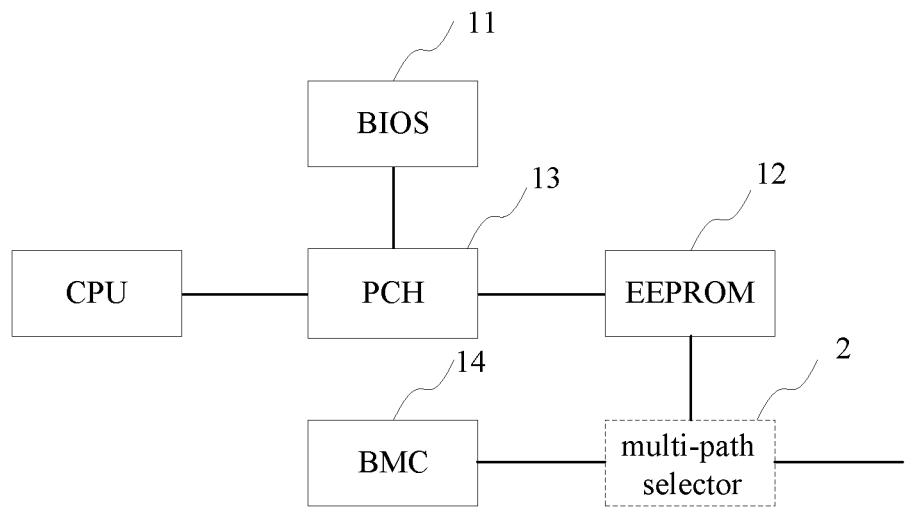
FIG. 2 is a structural diagram of a master-node according to one embodiment of the present disclosure.

As shown in FIG. 2, the master-node includes a master-node BIOS 11, a master-node memory 12 (e.g. EEPROM) and a baseboard management controller (BMC) 14; the master-node BIOS 11 is configured to record master-node information into the master-node memory 12. In one embodiment of the present disclosure, the master-node BIOS 11 accesses the master-node memory 12 through a master-node south bridge chip 13 (PCH). The master-node south bridge chip 13 is connected to the master-node memory 12 via a system management bus (SMBus) interface. The BMC 14 is configured to access the master-node memory 12 and decide to access the slave-node memory of one of the slave-nodes via the multi-path selector 2. Therefore, it is possible to access the relevant information recorded in the master-node memory 12 and the slave-node memory 32 through the BMC 14 in the master-node 1.

In one embodiment of the present disclosure, the master-node information includes one or more combinations of master-node triggering event information and master-node system error information.

The multi-path selector 2 is connected to the BMC 14 via the I²C bus, and connected to the slave-node memory via the I²C bus. Specifically, according to the protocols of the SMBus spec and the I²C spec, the SMBus is fully compatible with the I²C signal at a physical layer (both have SDA and SCLKs signals only). It is noted that the SMBus upgrades and defines the I²C command at an internet protocol layer. When accessing the I²C EEPROM through the SMBus interface, the access has to be performed according to the read/write timing of EEPROM. Otherwise, the signals received by the EEPROM might be analyzed incorrectly and cannot be read or written.

When accessing the I²C EEPROM, each of the BIOS and the BMC must serve as a master for obtaining an accessing authority, while the I²C signal does not support the master arbitration mechanism. Therefore, in the present disclosure, the access of the BIOS and the BMC is controlled by the general purpose input/output (GPIO) port which is connected between the master-node south bridge chip and the baseboard management controller. In one embodiment of the present disclosure, the master-node BIOS accesses the master-node memory when the GPIO signal is a first value; the BMC accesses the master-node memory when the GPIO signal is a second value. Specifically, by connecting the GPIO of the master-node south bridge chip to the GPIO of the BMC; when the GPIO signal is low, the BIOS accesses the master-node memory for recording events and errors. At this time, the BMC is waiting for a polling process; the GPIO signal is pulled up when the access of the BIOS is finished. When the BMC detects that the GPIO signal is high, the BMC has the accessing authority for reading corresponding event records and error records from the master-node memory.

Figure 4:
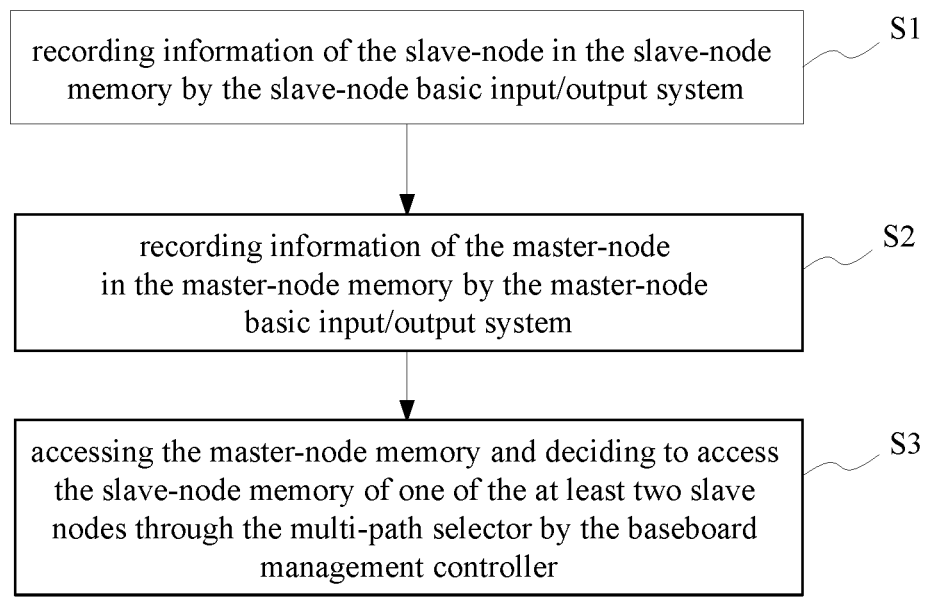
FIG. 4 is a flow chart of a method for reading and writing information in a server with a master-slave architecture according to one embodiment of the present disclosure.

As shown in FIG. 4, in one embodiment, a method for reading and writing information in a server with a master-slave architecture is applied to the above-mentioned server with the master-slave architecture. Wherein, the server with the master-slave architecture includes a master-node, a multi-path selector and at least two slave-nodes; each of the at least two slave-nodes is connected to the master-node via the multi-path selector; the slave-node includes a slave-node BIOS and a slave-node memory. The master-node includes a master-node BIOS, a master-node memory and a BMC.

Specifically, the method for reading and writing information in the server with the master-slave architecture includes:

In step S1, the slave-node basic input/output system records information of the slave-node in the slave-node memory.

Specifically, for the slave-node, when it is necessary to record triggering event information and/or system error information, the above information is recorded in the slave-node memory directly by the slave-node BIOS. Wherein, the slave-node BIOS accesses the slave-node memory through a slave-node south bridge chip (PCH) for information writing. The slave-node south bridge chip is connected to the slave-node memory via a SMBus interface.

In step S2, the master-node basic input/output system records information of the master-node in the master-node memory.

Specifically, for the master-node, when it is necessary to record triggering event information and/or system error information, the above information is recorded in the master-node memory directly by the master-node BIOS. Wherein, the master-node BIOS accesses the master-node memory through the master-node south bridge chip (PCH) for information writing. The master-node south bridge chip is connected to the master-node memory via a SMBus interface.

In step S3, the baseboard management controller accesses the master-node memory and decides to access the slave-node memory of one of the at least two slave nodes through the multi-path selector.

Specifically, when it is required to obtain the triggering event information and/or the system error information of the master-node and/or the slave-node, the master-node memory or the slave-node memory is accessed through the BMC of the master-node.

When accessing the master-node memory, each of the BIOS and the BMC must serve as a master for obtaining an access authority, while the I2C signal does not support a master arbitration mechanism. Therefore, in the present disclosure, the access of the BIOS and the BMC is controlled by the GPIO port which is connected between the master-node south bridge chip and the baseboard management controller. In one embodiment of the present disclosure, the master-node BIOS accesses the master-node memory when the GPIO signal is a first value; the BMC accesses the master-node memory when the GPIO signal is a second value. Specifically, by connecting the GPIO of the master-node south bridge chip to the GPIO of the BMC; when the GPIO signal is low, the BIOS accesses the master-node memory for recording events and errors. At this time, the BMC is waiting for a polling process; when the access of the BIOS is finished, the GPIO signal is pulled up. When the BMC detects that the GPIO signal is high, the BMC has the accessing authority for reading corresponding event and error records from the master-node memory.

In one embodiment of the present disclosure, the BMC is connected to the multi-path selector via a I²C bus, and the multi-path selector is connected to the slave-node memory via a I²C bus. Therefore, when accessing the slave-node memory, the BMC accesses the multi-path selector via the I²C bus, and selects one of the slave-nodes and further access the slave-node memory of the slave-node via the I²C bus.

In view of the above description, in the server with the master-slave architecture and the method for reading and writing information thereof disclosed in the present disclosure, memories are used for recording the triggering event information and the system error information in the server with the master-slave architecture. There is no need to set a BMC for each node of the server, thereby hardware costs are reduced effectively. Even though an error occurs in the BMC of the master-node, normal records of information can be still ensured and thereby it is not affected by hardware states and has a high stability. Thus, the present disclosure overcomes various defects of the conventional techniques and has a high industrial utilization value.

The above embodiments are merely used for illustrating the principle and effects of the present disclosure, but is not intended to limit the present disclosure. Modifications or alternations to the above embodiments could be made by those skilled in the art without departing from the spirit and the scope of the present disclosure. Therefore, all of equivalent modifications and alternations made by persons skilled in the art without departing from the spirit and the scope of the present disclosure are still covered by the claims of the present disclosure.

What is claimed is:

1. A server with a master-slave architecture, comprising: a master node, a multi-path selector and at least two slave nodes; with each of the at least two slave nodes connected to the master node through the multi-path selector;

each of at least two slave nodes comprising a slave-node basic input/output system and a slave-node memory, the slave-node basic input/output system configured to record slave-node information in the slave-node memory;

the master node comprising a master-node basic input/output system, a master-node memory and a baseboard management controller; the master-node basic input/output system configured to record master-node information in the master-node memory, the baseboard management controller configured to access the master-node memory and decide to access the slave-node memory of one of the at least two slave nodes through the multi-path selector wherein a general purpose input/output port of a master-node south bridge chip is connected to a general purpose input/output port of the baseboard management controller; the master-node basic input/output system accesses the master-node memory when a general purpose input/output port signal is a first value; the baseboard management controller accesses the master-node memory when the general purpose input/output port signal is a second value.

2. The server with the master-slave architecture according to claim 1, wherein the slave-node information comprises one or more combinations of triggering event information and system error information; the master-node information comprises one or more combinations of triggering event information and system error information.

3. The server with the master-slave architecture according to claim 1, wherein:

the slave-node basic input/output system accesses the slave-node memory through a slave-node south bridge chip; the slave-node south bridge chip is connected to the slave-node memory via a system management bus interface;

the master-node basic input/output system accesses the master-node memory through the master-node south bridge chip; the master-node south bridge chip is connected to the master-node memory via a system management bus interface.

4. The server with the master-slave architecture according to claim 1, wherein the baseboard management controller is connected to the multi-path selector via a I²C bus, and the multi-path selector is connected to the slave-node memory via a I²C bus.

5. A method of reading and writing information in a server with a master-slave architecture, wherein the server with the master-slave architecture comprises a master node, a multi-path selector and at least two slave nodes; each of the at least two slave nodes is connected to the master node through the multi-path selector; each of at least two slave nodes comprises a slave-node basic input/output system and a slave-node memory, and the master node comprises a master-node basic input/output system, a master-node memory and a baseboard management controller, wherein a general purpose input/output port of a master-node south bridge chip is connected to a general purpose input/output port of the baseboard management controller;

the method of reading and writing information in the server with the master-slave architecture comprising:

recording information of the slave-node in the slave-node memory by the slave-node basic input/output system;

recording information of the master-node in the master-node memory by the master-node basic input/output system; and accessing the master-node memory and deciding to access the slave-node memory of one of the at least two slave nodes through the multi-path selector by the baseboard management controller, wherein the master-node basic input/output system accesses the master-node memory when a general purpose input/output port signal is a first value; the baseboard management controller accesses the master-node memory when the general purpose input/output port signal is a second value.

6. The method of reading and writing information in the server with the master-slave architecture according to claim 5, wherein the information of the slave-node comprises one or more combinations of triggering event information and system error information; the information of the master-node comprises one or more combinations of triggering event information and system error information.

7. The method of reading and writing information in the server with the master-slave architecture according to claim 5, wherein:

the slave-node basic input/output system accesses the slave-node memory through a slave-node south bridge chip; the slave-node south bridge chip is connected to the slave-node memory via a system management bus interface;

the master-node basic input/output system accesses the master-node memory through the master-node south bridge chip; the master-node south bridge chip is connected to the master-node memory via a system management bus interface.

8. The method of reading and writing information in the server with the master-slave architecture according to claim 5, wherein the baseboard management controller is connected to the multi-path selector via a I²C bus, and the multi-path selector is connected to the slave-node memory via the I²C bus.

* * * * *